(12) United States Patent
Tsai

(10) Patent No.: US 11,521,812 B2
(45) Date of Patent: Dec. 6, 2022

(54) ROLLER INPUT DEVICE

(71) Applicant: Chicony Electronics Co., Ltd., New Taipei (TW)

(72) Inventor: Ho-Chin Tsai, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/372,886

(22) Filed: Jul. 12, 2021

(65) Prior Publication Data
US 2022/0051859 A1    Feb. 17, 2022

(30) Foreign Application Priority Data
Aug. 12, 2020   (TW) ................. 109127434

(51) Int. Cl.
H01H 19/14    (2006.01)
H01H 19/54    (2006.01)
G06F 3/0362   (2013.01)
H01H 25/00    (2006.01)

(52) U.S. Cl.
CPC .......... H01H 19/14 (2013.01); G06F 3/0362 (2013.01); H01H 19/54 (2013.01); H01H 25/008 (2013.01); H01H 2019/146 (2013.01)

(58) Field of Classification Search
CPC ...... H01H 19/14; H01H 19/11; H01H 19/585; H01H 19/58; H01H 19/62; H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01
See application file for complete search history.

(56) References Cited

U.S. PATENT DOCUMENTS 7,012,594 B2 *   3/2006  Wang .................... G06F 3/0362
                                                       345/163
8,094,125 B2 *   1/2012  Hou ....................... G06F 3/0362
                                                       345/163
11,175,702 B2 *  11/2021 Ou ........................ G06F 3/03543

FOREIGN PATENT DOCUMENTS

TW            I696063 B    6/2020

* cited by examiner

Primary Examiner — Ahmed M Saeed
(74) Attorney, Agent, or Firm — Muncy, Geissler, Olds & Lowe, P.C.

(57) ABSTRACT

A roller input device includes a casing and a roller. A roller seat and an encoder are disposed in the casing. The roller is pivotally disposed on the roller seat. The body of the roller includes a shaft portion, a first side, and a second side. The first side and the second side are at opposite sides of the body. The first shaft and the second shaft of the roller are connected to the shaft portion and respectively extend from the first side and the second side. An end portion of the first shaft and an end portion of the second shaft away from the shaft portion respectively have a first connection portion and a second connection portion. A structural strength of the first connection portion is greater than a structural strength of the second connection portion, and the first connection portion is connected to the encoder.

14 Claims, 5 Drawing Sheets

ROLLER INPUT DEVICE

CROSS-REFERENCE TO RELATED APPLICATION

This non-provisional application claims priority under 35 U.S.C. § 119(a) to Patent Application No. 109127434 filed in Taiwan, R.O.C. on Aug. 12, 2020, the entire contents of which are hereby incorporated by reference.

BACKGROUND

Technical Field

The instant disclosure relates to an input device, in particular, to a roller input device.

Related Art

Commonly, computers are used along with roller input devices. For example, the roller input device may be a keyboard with roller or may be a mouse, and the user can use the roller input device to perform actions, such as dragging item(s), scrolling pages, or switching menu(s).

SUMMARY

Most of the rollers of roller input devices known to the inventor need illumination so as to enhance the visual feelings of the roller input device and to facilitate the operation of the roller input device in dark environments. As a result, the material available for manufacturing the roller is thus limited. For example, the roller of the roller input device known to the inventor is made of transparent resin and integrally formed as a one-piece member. Therefore, during the operation of the roller, the shaft of the roller may be broken due to insufficient structural strength.

In view of this, in one embodiment, a roller input device is provided. The roller input device comprises a casing and a roller. A roller seat and an encoder are disposed in the casing. The roller is pivotally disposed on the roller seat and comprises a body, a first shaft, and a second shaft. The body comprises a shaft portion, a first side, and a second side. The first side and the second side are at opposite sides of the body. The first shaft is connected to the shaft portion and extends from the first side. The second shaft is connected to the shaft portion and extends from the second side. An end portion of the first shaft away from the shaft portion has a first connection portion. An end portion of the second shaft away from the shaft portion has a second connection portion. A structural strength of the first connection portion is greater than a structural strength of the second connection portion, and the first connection portion is connected to the encoder.

Based on the above, in the roller input device according to one or some embodiments of the instant disclosure, for the roller, the structural strength of the first connection portion of the first shaft is greater than the structural strength of the second connection portion of the second shaft, and the first connection portion with greater structural strength is connected to the encoder. Therefore, during the operation of the roller, the first connection portion of the first shaft does not get broken easily.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
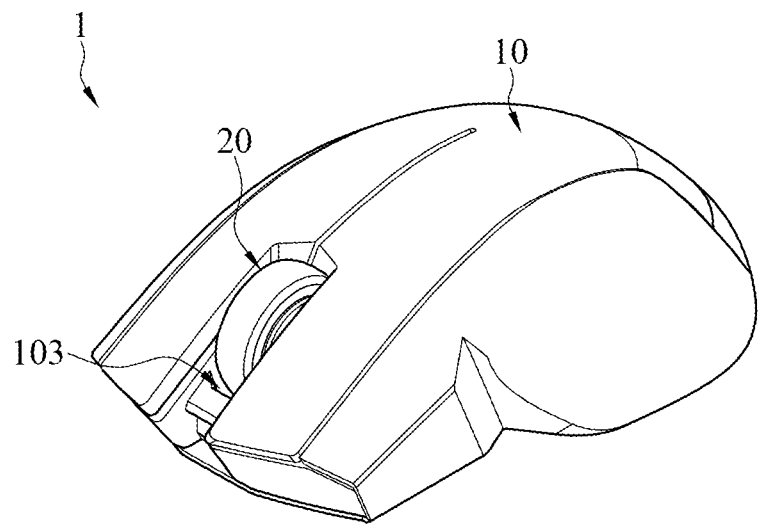
FIG. 1 illustrates a perspective view of a roller input device according to an exemplary embodiment of the instant disclosure.
Figure 2:
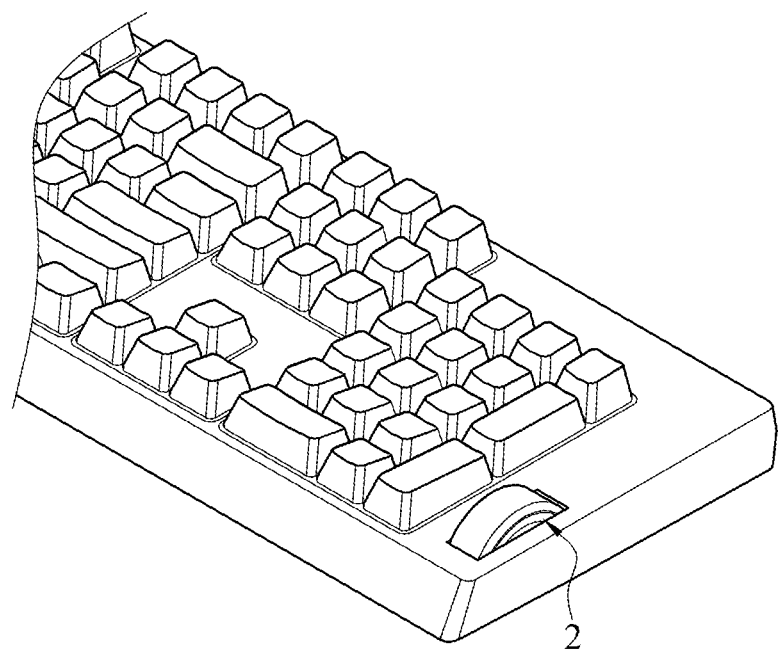
FIG. 2 illustrates a perspective view of a roller input device according to another exemplary embodiment of the instant disclosure.

FIG. 1 illustrates a perspective view of a roller input device according to an exemplary embodiment of the instant disclosure, and FIG. 2 illustrates a perspective view of a roller input device according to another exemplary embodiment of the instant disclosure. As shown in FIGS. 1 and 2, the roller input device is an input device of a computer, and the roller input device is provided for operating the computer to execute actions (such as dragging item(s), scrolling pages, or switching menu(s)). As shown in FIG. 1, in this embodiment, the roller input device 1 is a mouse. In another embodiment, as shown in FIG. 2, the roller input device 2 may be combined with the keyboard, but embodiments are not limited thereto. In the following paragraphs, the mouse for a computer is taken as an illustrative example for the roller input device 1.

Figure 3:
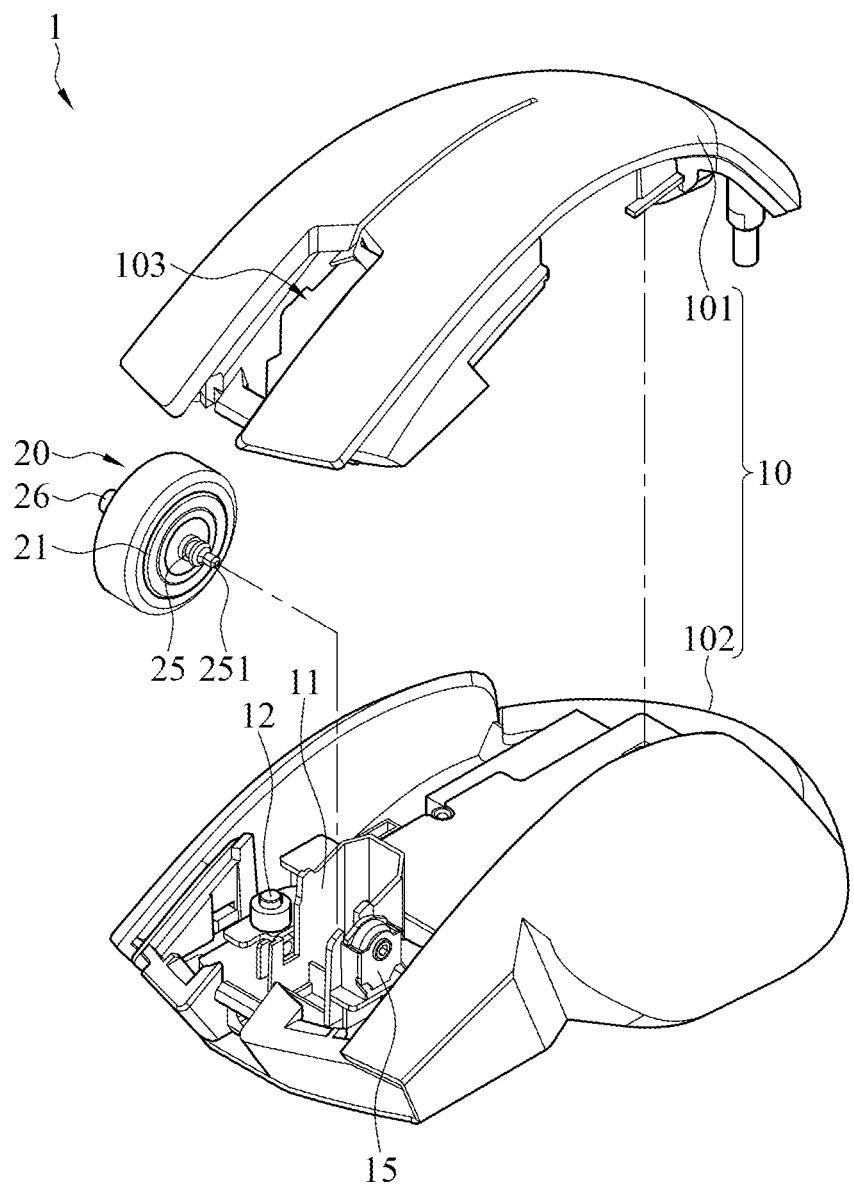
FIG. 3 illustrates an exploded view of the roller input device of the exemplary embodiment.
Figure 4:
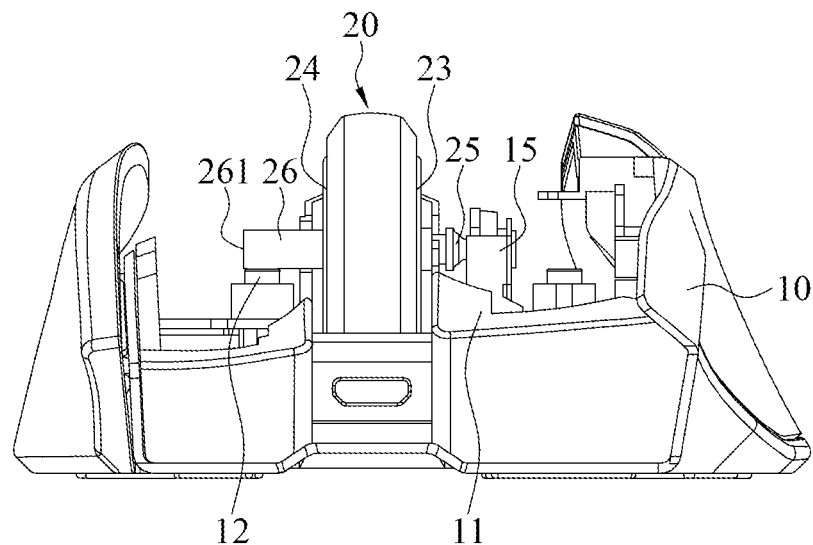
FIG. 4 illustrates a partial side view of the roller input device of the exemplary embodiment.

FIG. 3 illustrates an exploded view of the roller input device of the exemplary embodiment, and FIG. 4 illustrates a partial side view of the roller input device of the exemplary embodiment. As shown in FIGS. 1, 3, and 4, the roller input device 1 comprises a casing 10 and a roller 20. A roller seat 11, a pressable switch 12, and an encoder 15 are disposed in the casing 10. In this embodiment, the casing 10 is formed by combining an upper portion 101 with a lower portion 102, and the pressable switch 12 and the encoder 15 are respectively disposed on opposite two sides of the roller seat 11.

As shown in FIGS. 1, 3, and 4, the roller 20 is pivotally disposed on the roller seat 11 and in the casing 10. A surface of the casing 10 has a through hole 103, and a portion of the roller 20 protrudes from the through hole 103, so that parts of the roller 20 are exposed from the casing 10 and can be operated by a user. For example, the roller 20 may be operated so as to roll relative to the casing 10 and the roller seat 11 and perform the page scrolling (upwardly or downwardly) action.

Figure 5:
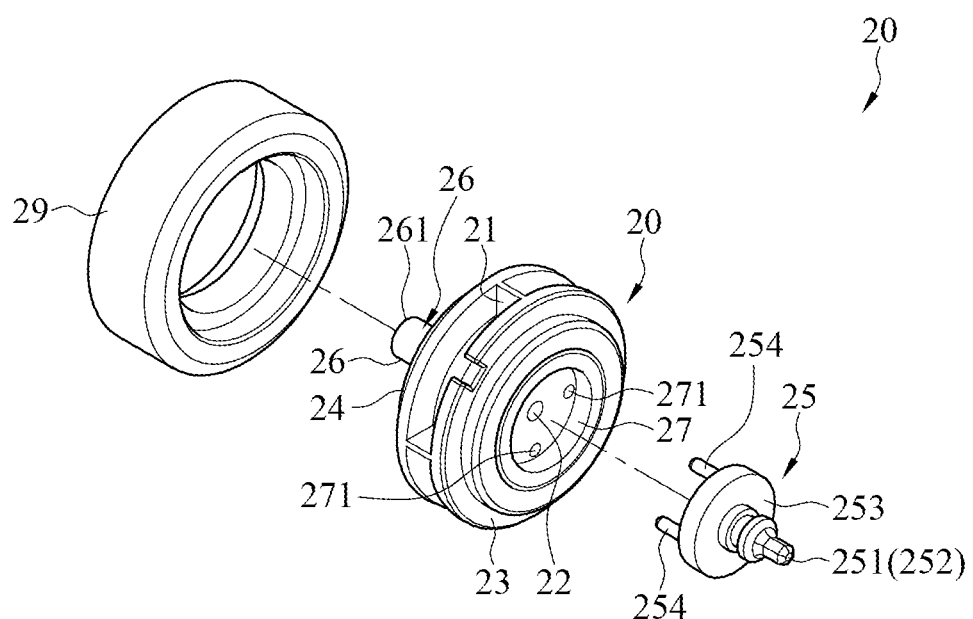
FIG. 5 illustrates an exploded view of a roller according to a first embodiment of the instant disclosure.

FIG. 5 illustrates an exploded view of a roller according to a first embodiment of the instant disclosure. As shown in FIGS. 3 to 5, in this embodiment, the roller 20 comprises a body 21, a first shaft 25, and a second shaft 26. The body 21 comprises a shaft portion 22, a first side 23, and a second side 24. The first side 23 and the second side 24 are respectively at opposite sides of the body 21. The shaft portion 22 may be the center portion of the body 21. The first shaft 25 is connected to the shaft portion 22 and extends from the first side 23, and the second shaft 26 is connected to the shaft portion 22 and extends from the second side 24. Moreover, an end portion of the first shaft 25 away from the shaft portion 22 has a first connection portion 251, an end portion of the second shaft 26 away from the shaft portion 22 has a second connection portion 261, a structural strength of the first connection portion 251 is greater than a structural strength of the second connection portion 261, and the first connection portion 251 is connected to the encoder 15.

As shown in FIG. 5, in some embodiments, an outer ring 29 may be fitted over the body 21 of the roller 20. For example, the outer ring 29 may be a rubber ring to improve the operation feelings of the user.

In some embodiments, the encoder 15 may be rotary encoder, and the rotary encoder is provided for converting the angular position or motion into analog or digital signals. For example, the encoder 15 may be a mechanical encoder. After the first connection portion 251 of the first shaft 25 of the roller 20 is connected to the encoder 15, during the rolling of the roller 20, the first connection portion 251 drives the encoder disk in the encoder 15 to move at the same time, so that the encoder 15 can generate signals to detect the rolling direction and the rolling extent of the roller 20.

Accordingly, in the roller input device according to one or some embodiments of the instant disclosure, the first connection portion 251 of the first shaft 25 and the second connection portion 261 of the second shaft 26 have different structural strengths, and the first connection portion 251 with greater structural strength is connected to the encoder 15. Therefore, during the operation of the roller 20, the first shaft 25 does not get broken easily.

Specifically, in one or some embodiments, chemical liquids (e.g., lubricants) may be added into the encoder 15 to allow the components (e.g., the bearing or the encoder disk) to rotate smoothly. However, due to the concern of light transmittance of the roller, the roller known to the inventor is made of transparent resin and integrally formed as a one-piece member. As a result, the shaft of the roller connected to the encoder may get brittle upon reacting with the chemical liquids. Thus, during the operation of the roller, the shaft may be broken easily upon a force is applied to the shaft. In view of this, in the roller input device of this embodiment, the structural strength of the first connection portion 251 connected to the encoder 15 is improved. Therefore, during the operation of the roller 20, the first shaft 25 can be prevented from being broken easily, thereby extending the lifetime of the roller input device 1.

As shown in FIG. 4, in some embodiments, the second connection portion 261 of the second shaft 26 of the roller 20 may be disposed on the pressable switch 12. Accordingly, when the roller 20 is pressed, the second connection portion 261 of the second shaft 26 presses the pressable switch 12 to generate corresponding control signal(s). For example, the control signal(s) may control the computer to open a new page of an application program.

The implementations showing the structural strength of the first connection portion 251 is greater than the structural strength of the second connection portion 261 may have several embodiments. The embodiments are described in the following paragraphs with different drawings.

As shown in FIGS. 4 and 5, in this embodiment, the body 21 and the second shaft 26 are integrally formed as a one-piece member, and the first shaft 25 is assembled at the shaft portion 22. In some embodiments, the first shaft 25 may be assembled at the shaft portion 22 of the body21 through, for example, hot-melting, threading, ultrasonic welding, adhering, or engaging, but embodiments are not limited thereto. The body 21 and the second shaft 26 may be integrally formed as a one-piece member through mechanical machining, injection molding, or other manners.

Further, as shown in FIG. 5, a material of the first shaft 25 may be different from a material of the second shaft 26. For example, the structural strength of the material for manufacturing the first shaft 25 may be greater than the structural strength of the material for manufacturing the second shaft 26. Moreover, the first connection portion 251 is integrally formed with the end portion of the first shaft 25 away from the shaft portion 22, and the second connection portion 261 is integrally formed with the end portion of the second shaft 26 away from the shaft portion 22. Hence, the structural strength of the first connection portion 251 is greater than the structural strength of the second connection portion 261. In this embodiment, the first connection portion 251 is a polygonal shaft, and the entire first shaft 25 may be integrally formed as a one-piece member through mechanical machining, injection molding, or other manners.

In some embodiments, the material of the body 21 and the material of the second shaft 26 may be transparent resin, and the transparent resin may be polycarbonate (PC) or polymethylmethacrylate (PMMA). Accordingly, the body 21 is light transmissive. Therefore, when a light illuminates the body 21 and enters into the body 21, the light can be emitted outward from the body 21, thus improving the visual feelings and facilitating the operation of the roller input device in dark environments. Moreover, by integrally forming the second shaft 26 and the body 21 with each other as a one-piece member, the manufacturing time and cost for the roller input device can be reduced. The material of the first shaft 25 may be polyoxymethylene (POM). The POM material has features of light weighted, stiff, proper rigidity, good elasticity, small friction coefficient, low moisture absorbability, and proper insulation property. Moreover, the POM material can resist chemical solvents and can suffer high loading and stress. Therefore, in the embodiment that the first shaft 25 is made of POM, the first connection portion 251 can be prevented from being affected by the chemical liquid of the encoder 15, and the capability of the entire first shaft 25 for suffering loading and stress can be enhanced thereby further prolonging the lifetime of the roller input device, but embodiments are not limited thereto. In some embodiments, the first shaft 25 may be made of other materials which can resist chemical solvents and have high structural strength.

Moreover, as shown in FIGS. 4 and 5, the structural strength of the second connection portion 261 of the second shaft 26 is less than the structural strength of the first connection portion 251 of the first shaft 25. Therefore, during the rolling of the roller 20, the second connection portion 261 of the second shaft 26 can be prevented from rubbing against the pressable switch 12 to generate excessive noises.

In some embodiments, the assembling between the first shaft 25 and the shaft portion 22 of the body 21 may have following implementations. As shown in FIG. 5, in this embodiment, the shaft portion 22 of the body 21 has an assembling groove 27. The first shaft 25 comprises a first end 252 and a second end 253 opposite to the first end 252. The first connection portion 251 is integrally formed at the first end 252, and the second end 253 is assembled in the assembling groove 27. For example, the second end 253 may be assembled in the assembling groove 27 through, for example, hot-melting, threading, ultrasonic welding, adhering, or engaging.

Further, as shown in FIG. 5, in this embodiment, the assembling groove 27 is a groove recessed from the first side 23 of the roller 20 and corresponds to the shaft portion 22, the second end 253 of the first shaft 25 is a block member having a shape corresponding to the shape of the assembling groove 27, and the second end 253 has at least one fixation post 254. The assembling groove 27 of the body 21 has at least one fixation hole 271 corresponding to the at least one fixation post 254 (in this embodiment, the number of the fixation posts 254 and the number of the fixation holes 271 are plural, but embodiments are not limited thereto). During the assembling, the second end 253 of the first shaft 25 can be correspondingly engaged with the assembling groove 27, so that the fixation posts 254 are respectively engaged with the fixation holes 271, and the first shaft 25 can be fixed with the body 21. In some embodiments, after the second end 253 of the first shaft 25 is engaged with the assembling groove 27 and the fixation posts 254 are engaged with the fixation holes 271, adhesive may be injected in the assembling groove 27 for improving the fixation effect. In another embodiment, alternatively, the fixation post 254 may be a hot-melt post. After the fixation post 254 is engaged with the fixation hole 271, the fixation between the first shaft 25 and the body 21 may be further improved through hot melting.

Figure 6:
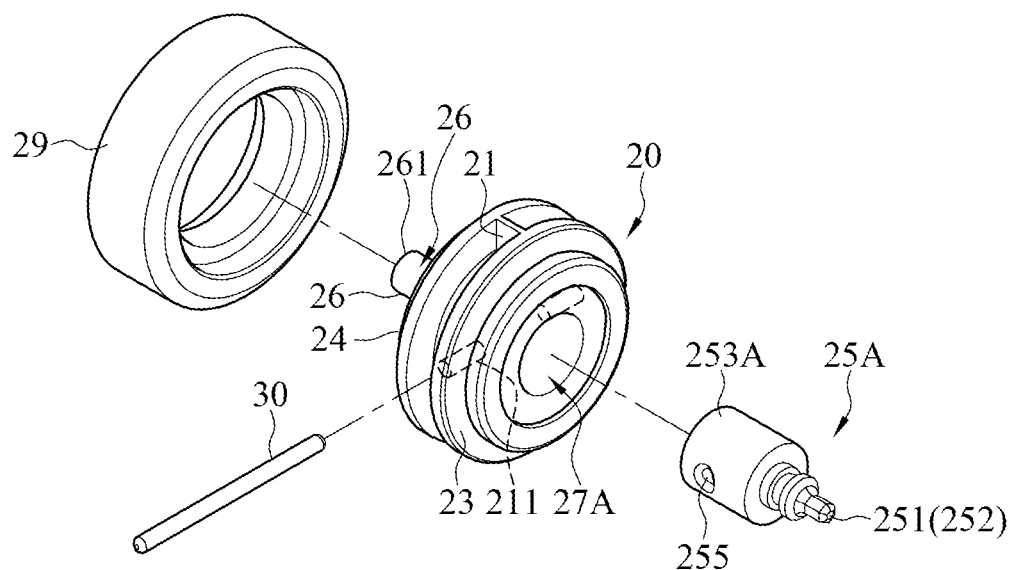
FIG. 6 illustrates an exploded view of a roller according to a second embodiment of the instant disclosure.

FIG. 6 illustrates a perspective view of a roller according to a second embodiment of the instant disclosure. As shown in FIG. 6, in this embodiment, the first side 23 of the body 21 also has an assembling groove 27A. One of the differences between this embodiment and the embodiment shown in FIG. 5 is that, in this embodiment, the body 21 has a pin hole 211 in communication with the assembling groove 27A. In this embodiment, the pin hole 211 is radially defined through the body 21, and the shape of the second end 253A of the first shaft 25A may correspond to the shape of the assembling groove 27A (in this embodiment, both the second end 253A and the assembling groove 27A are round cylinder shaped, but embodiments are not limited thereto). Moreover, the second end 253A is received in the assembling groove 27A and has a radial groove 255. A pin member 30 is inserted into the pin hole 211 and the radial groove 255. For example, the pin member 30 may be sequentially inserted into the pin hole 211 and the radial groove 255 from outside of the body 21, so that the second end 253A of the first shaft 25A is assembled in the assembling groove 27A. In some embodiments, after the pin member 30 is inserted into the pin hole 211 and the radial groove 255, adhesive may be injected into the assembling groove 27A for improving the fixation effect. In another embodiment, alternatively, the pin member 30 may be a hot-melt post. After the pin member 30 is inserted into the pin hole 211 and the radial groove 255, the fixation between the first shaft 25 and the body 21 may be further improved through hot melting.

Figure 7:
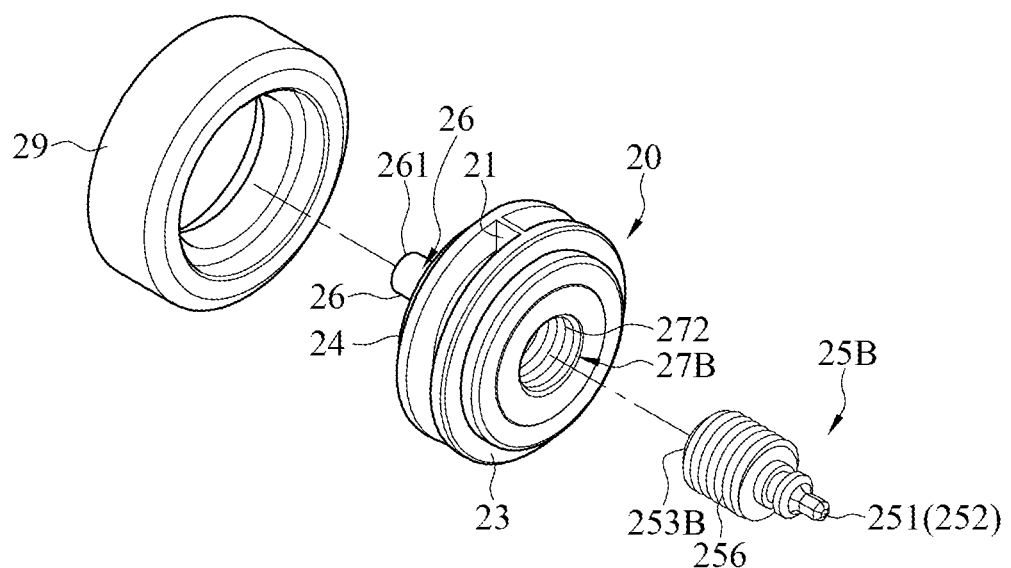
FIG. 7 illustrates an exploded view of a roller according to a third embodiment of the instant disclosure.

FIG. 7 illustrates a perspective view of a roller according to a third embodiment of the instant disclosure. As shown in FIG. 7, in this embodiment, the first side 23 of the body 21 also has an assembling groove 27B. One of the differences between this embodiment and the embodiments shown in FIGS. 5 and 6 is that, in this embodiment, the shape of the second end 253B of the first shaft 25B may correspond to the shape of the assembling groove 27B (in this embodiment, both the second end 253B and the assembling groove 27B are round cylinder shaped, but embodiments are not limited thereto). Moreover, in this embodiment, the second end 253B of the first shaft 25B has a first threaded portion 256, and the assembling groove 27B has a second threaded portion 272. For example, the first threaded portion 256 and the second threaded portion 272 may be male thread patterns and female threaded patterns corresponding to each other. The first threaded portion 256 of the first shaft 25B is threaded with the second threaded portion 272 of the assembling groove 27B, so that the first shaft 25B and the body 21 can be fixed with each other. In some embodiments, after the first threaded portion 256 is threaded with the second threaded portion 272, adhesive may be injected into the assembling groove 27B for improving the fixation effect.

Figure 8:
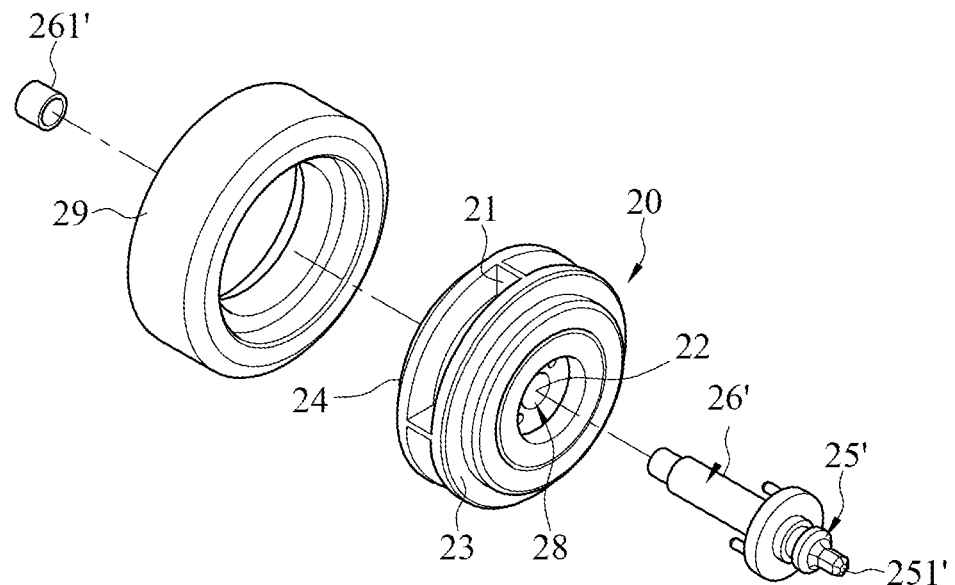
FIG. 8 illustrates an exploded view of a roller according to a fourth embodiment of the instant disclosure.
Figure 9:
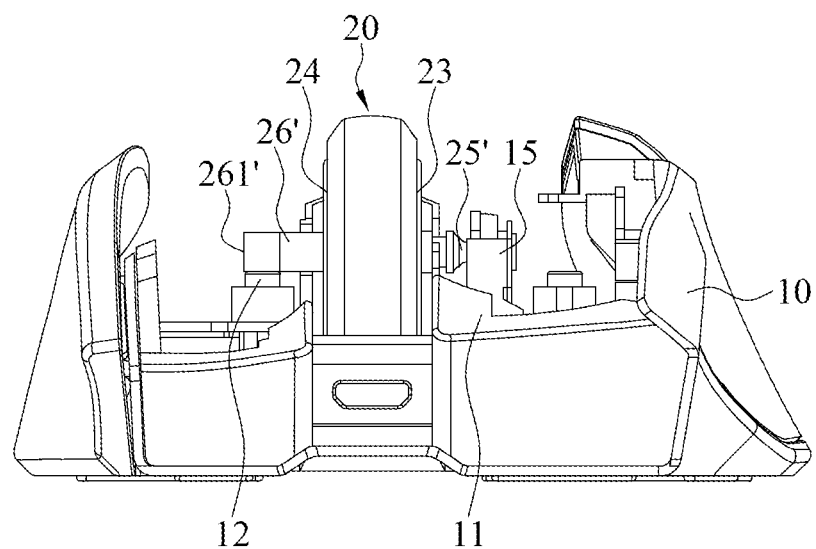
FIG. 9 illustrates a partial side view of a roller input device corresponding to the roller shown in FIG. 8.

FIG. 8 illustrates a perspective view of a roller according to a fourth embodiment of the instant disclosure, and FIG. 9 illustrates a partial side view of a roller input device corresponding to the roller shown in FIG. 8. As shown in FIGS. 8 and 9, the first shaft 25' and the second shaft 26' may be integrally formed as a one-piece member and together form a shaft member. For example, the first shaft 25' and the second shaft 26' may be integrally formed as a one-piece member through mechanical machining, injection molding, or other manners. The first connection portion 251' is integrally formed at the end portion of the first shaft 25' away from the shaft portion 22, the second connection portion 261' is assembled to the end portion of the second shaft 26' away from the shaft portion 22, and the material of the second connection portion 261' is different from the material of the first connection portion 251'. For example, the structural strength of the material for manufacturing the first shaft 25' and the second shaft 26' may be greater than the structural strength of the material for manufacturing the second connection portion 261', so that the structural strength of the first connection portion 251' is greater than the structural strength of the second connection portion 261'. Accordingly, in this embodiment, the structural strength of the first connection portion 251' connected to the encoder 15 can also be increased. Therefore, during the operation of the roller 20, the first shaft 25' can be prevented from getting broken easily.

In some embodiments, the second connection portion 261' may be a rod member or a jacket member, and the second connection member 261' may be assembled to the end portion of the second shaft 26' away from the shaft portion 22 through, for example, hot-melting, threading, ultrasonic welding, adhering, or engaging.

Further, as shown in FIGS. 8 and 9, in some embodiments, the material of the body 21 may be transparent resin, and the transparent resin may be polycarbonate (PC) or polymethylmethacrylate (PMMA). Accordingly, the body 21 is light transmissive. Therefore, when a light illuminates the body 21 and enters into the body 21, the light can be emitted outward from the body 21, thus improving the visual feelings and facilitating the operation of the roller input device in dark environments. The material of the first shaft 25' and the second shaft 26' may be polyoxymethylene (POM). Therefore, the first connection portion 251' can be prevented from being affected by the chemical liquid of the encoder 15, and the capability of the first shaft 25' and the second shaft 26' for suffering loading and stress can be enhanced. Moreover, since the first shaft 25' and the second shaft 26' are integrally formed with each other as a one-piece member, the structural strength of the one-piece member is further improved. The material of the second connection portion 261' may be resin, for example, the resin may be polycarbonate (PC) or polymethylmethacrylate (PMMA). For example, in this embodiment, the second connection portion 261' is a jacket fitted over the end portion of the second shaft 26' away from the shaft portion 22, and the second connection portion 261' is disposed on the pressable switch 12. Accordingly, during the rolling of the roller 20, the second connection portion 261' can be prevented from rubbing against the pressable switch 12 to generate excessive noises.

In some embodiments, the first shaft 25' and the second shaft 26' may be assembled to the shaft portion 22 of the body 21 through, for example, hot-melting, threading, ultrasonic welding, adhering, or engaging. For example, in this embodiment, the shaft portion 22 of the body 21 has a shaft hole 28, and the shaft member formed by the first shaft 25' and the second shaft 26' is assembled into the shaft hole 28. The shaft hole 28 is defined through the body 21 along an axial direction from the first side 23 to the second side 24. Therefore, the first shaft 25' extends from the first side 23, and the second shaft 26' extends from the second side 24.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A roller input device comprising:
   a casing, wherein a roller seat and an encoder are disposed in the casing; and
   a roller pivotally disposed on the roller seat and comprising a body, a first shaft, and a second shaft, wherein the body comprises a shaft portion, a first side, and a second side, wherein the first side and the second side are at opposite sides of the body, and wherein the first shaft is connected to the shaft portion and extends from the first side, and the second shaft is connected to the shaft portion and extends from the second side;
   wherein an end portion of the first shaft away from the shaft portion has a first connection portion, and an end portion of the second shaft away from the shaft portion has a second connection portion, wherein a material of the first connection portion is different from a material of the second connection portion, a structural strength of the first connection portion is greater than a structural strength of the second connection portion, and wherein the first connection portion is connected to the encoder.

2. The roller input device according to claim 1, wherein the body and the second shaft are integrated as a one-piece structure, and the first shaft is assembled on the shaft portion, wherein a material of the first shaft is different from a material of the second shaft, and wherein the first connection portion is integrally formed at the end portion of the first shaft away from the shaft portion, and the second connection portion is integrally formed at the end portion of the second shaft away from the shaft portion.

3. The roller input device according to claim 2, wherein a material of the body and the material of the second shaft are transparent resin, and the material of the first shaft is polyoxymethylene.

4. The roller input device according to claim 2, wherein the shaft portion of the body has an assembling groove, and wherein the first shaft has a first end and a second end opposite to the first end, the first connection portion is integrally formed at the first end of the first shaft, and the second end of the first shaft is assembled in the assembling groove.

5. The roller input device according to claim 3, wherein the shaft portion of the body has an assembling groove, and wherein the first shaft has a first end and a second end opposite to the first end, the first connection portion is integrally formed at the first end of the first shaft, and the second end of the first shaft is assembled in the assembling groove.

6. The roller input device according to claim 4, wherein the second end of the first shaft has a fixation post, the assembling groove has a fixation hole, and the fixation post of the first shaft is engaged with the fixation hole of the assembling groove.

7. The roller input device according to claim 6, wherein the fixation post is a hot-melt post.

8. The roller input device according to claim 4, wherein the body has a pin hole in communication with the assembling groove, and the second end of the first shaft is received in the assembling groove and has a radial groove, and wherein a pin member is inserted into the pin hole and the radial groove, so that the second end of the first shaft is assembled in the assembling groove.

9. The roller input device according to claim 4, wherein the second end of the first shaft has a first threaded portion, the assembling groove has a second threaded portion, and the first threaded portion of the first shaft is threaded with the second threaded portion of the assembling groove.

10. The roller input device according to claim 1, wherein the first shaft and the second shaft are integrated as a one-piece structure, and the first connection portion is integrally formed at the end portion of the first shaft away from the shaft portion, wherein the second connection portion is assembled to the end portion of the second shaft away from the shaft portion.

11. The roller input device according to claim 10, wherein a material of the body is transparent resin, a material of the first shaft and a material of the second shaft are polyoxymethylene, and the material of the second connection portion is resin.

12. The roller input device according to claim 1, wherein a pressable switch is disposed in the casing, and the second connection portion is disposed on the pressable switch.

13. The roller input device according to claim 2, wherein a pressable switch is disposed in the casing, and the second connection portion is disposed on the pressable switch.

14. The roller input device according to claim 11, wherein a pressable switch is disposed in the casing, and the second connection portion is disposed on the pressable switch.

* * * * *